Dec. 9, 1952          G. A. MONTOOTH          2,621,045

PIN CHANGER FOR BOWLING PIN SETTERS

Filed March 11, 1948          11 Sheets-Sheet 1

Inventor:
George A. Montooth.
By *[signature]*
Attorney

Dec. 9, 1952 G. A. MONTOOTH 2,621,045
PIN CHANGER FOR BOWLING PIN SETTERS
Filed March 11, 1948 11 Sheets-Sheet 3

Inventor.
George A. Montooth.
By [signature]
Attorney.

Dec. 9, 1952     G. A. MONTOOTH     2,621,045
PIN CHANGER FOR BOWLING PIN SETTERS
Filed March 11, 1948     11 Sheets-Sheet 4

Inventor.
George A. Montooth.

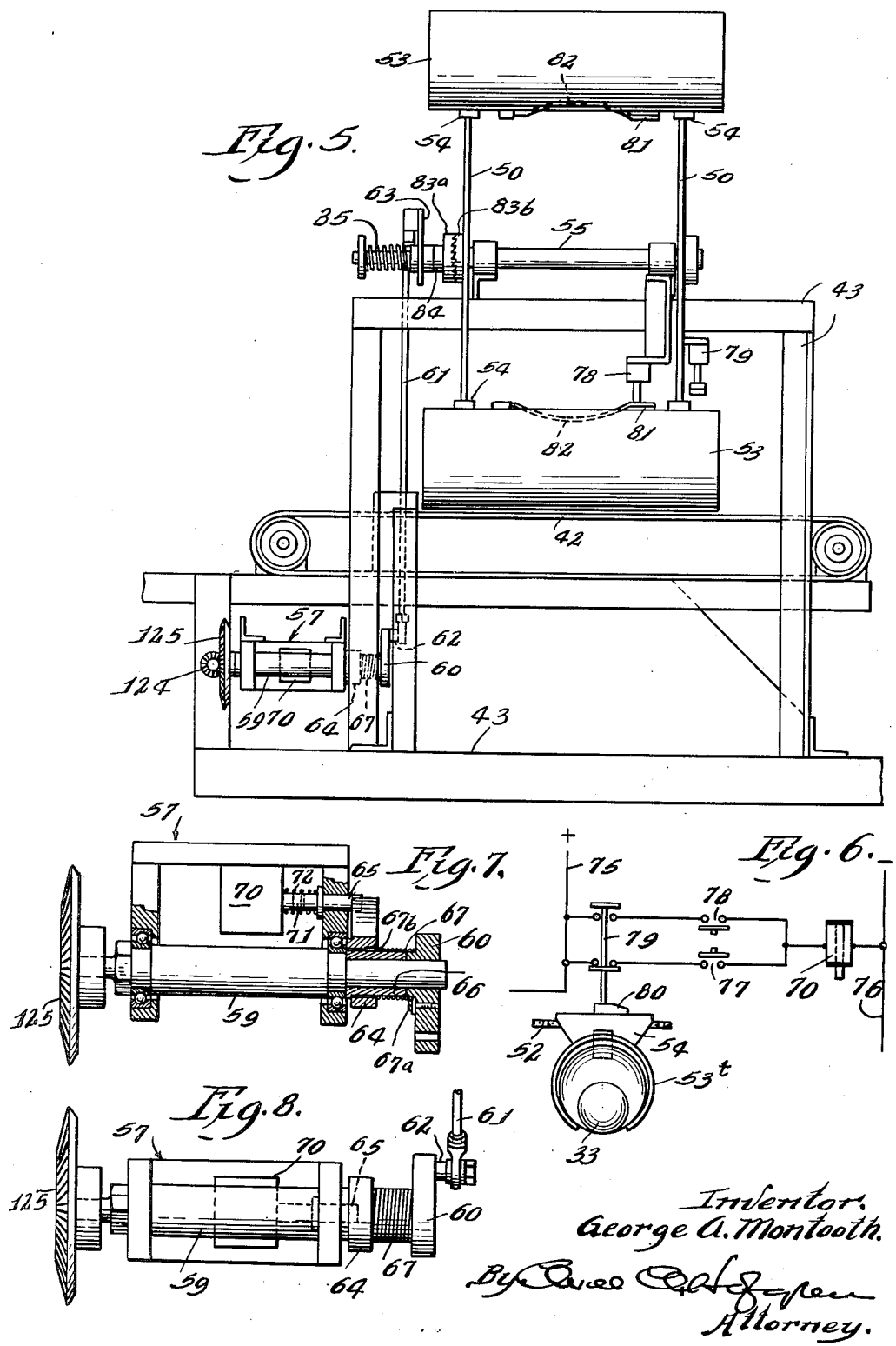

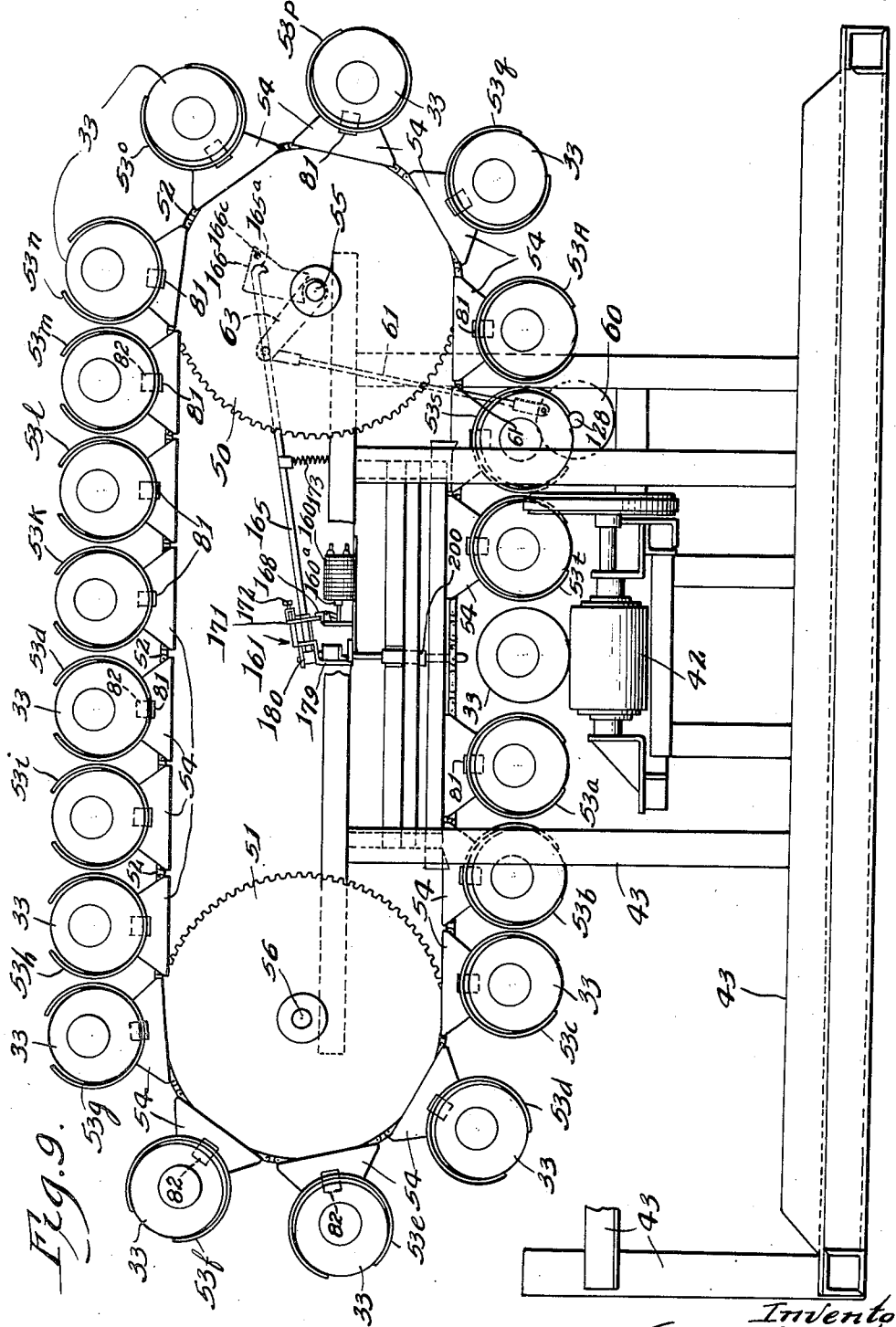

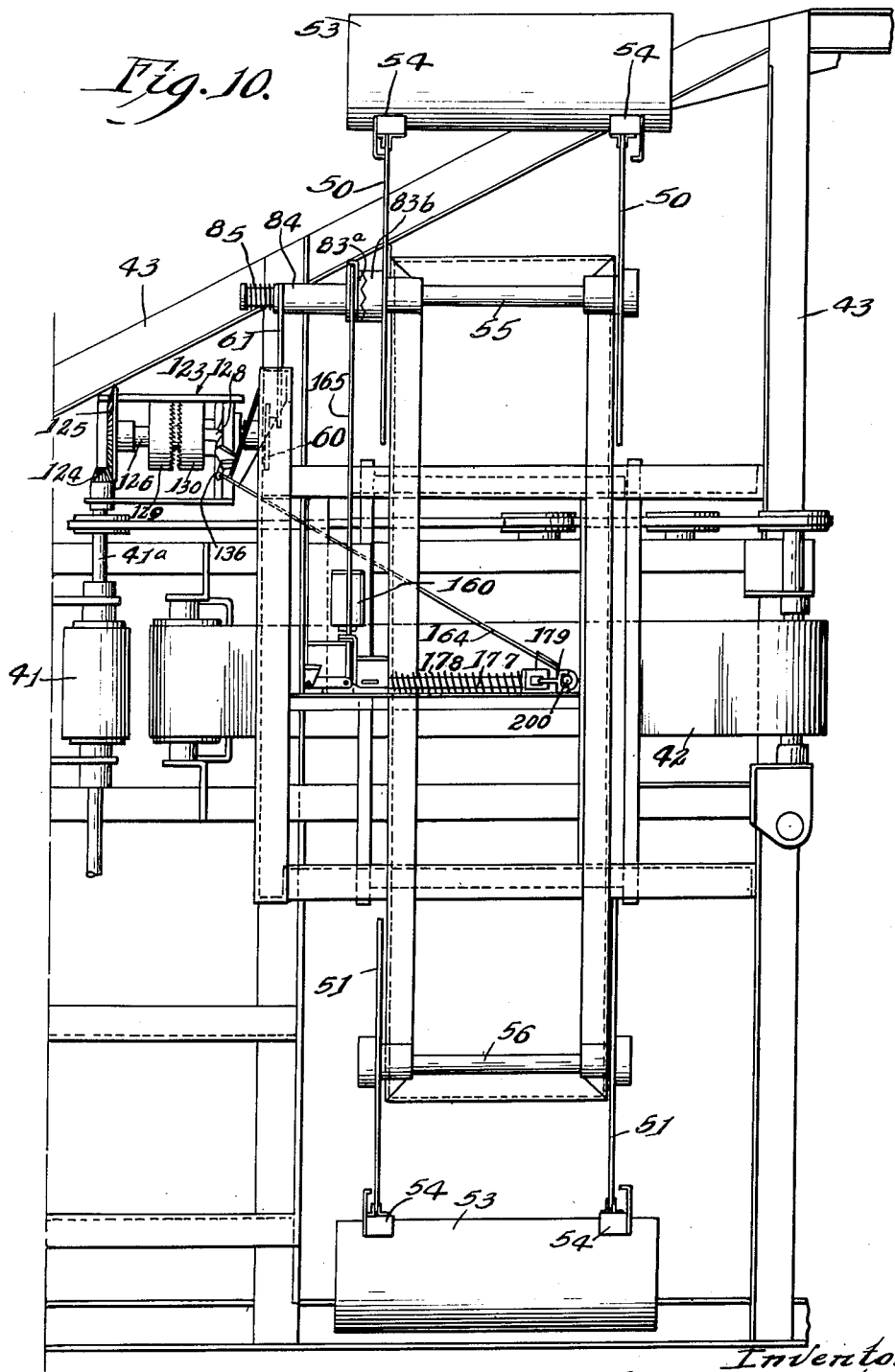

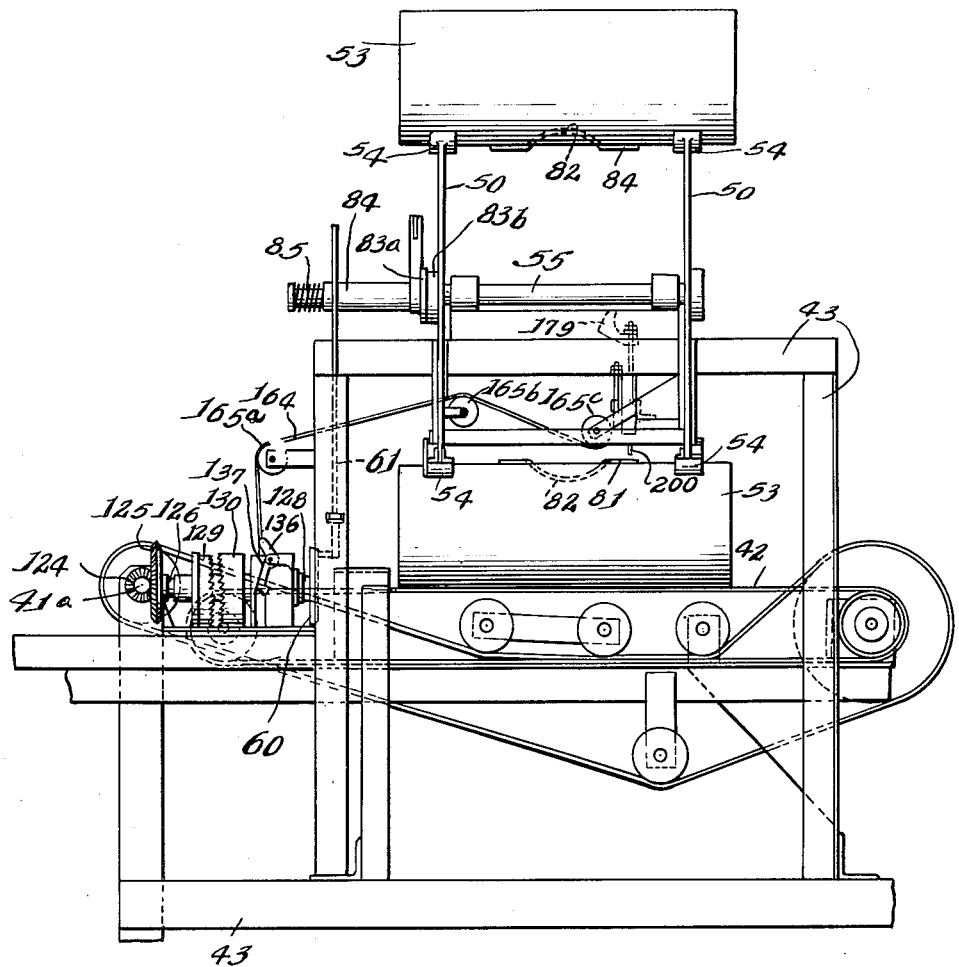

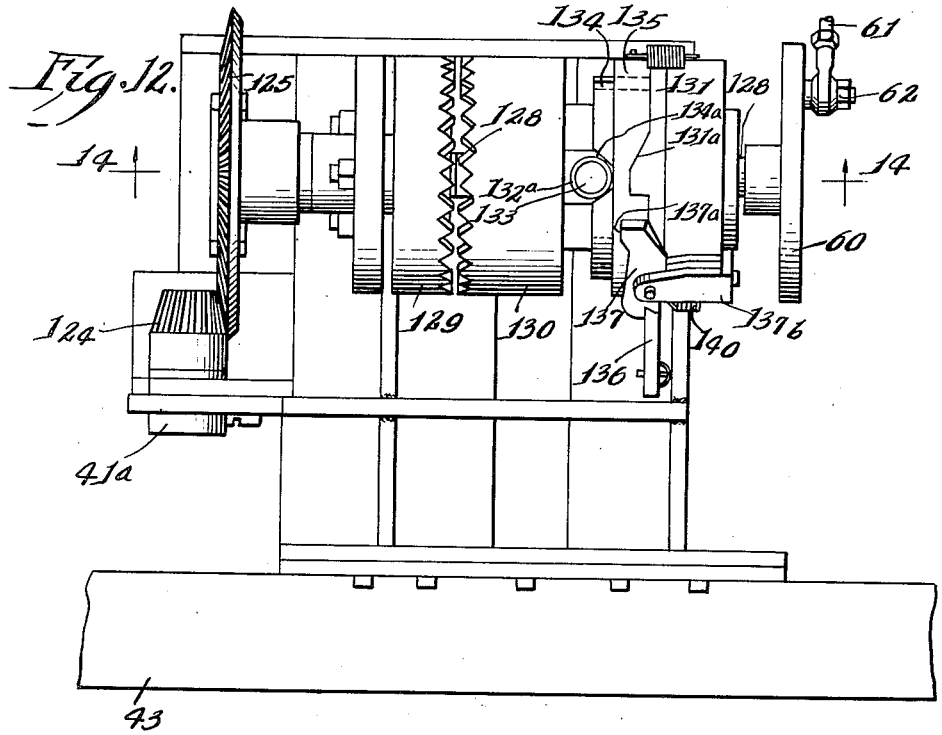
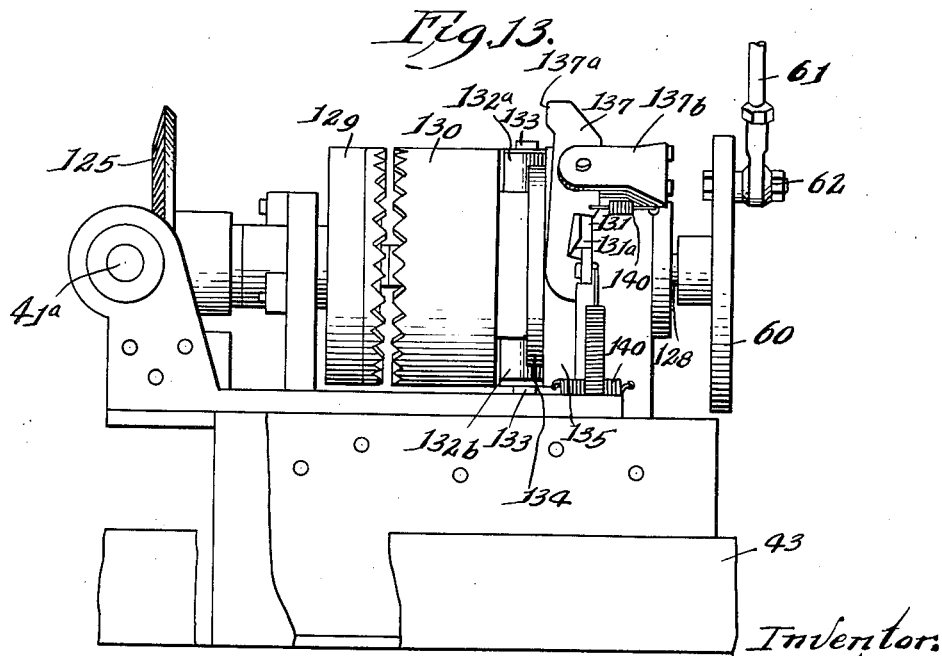

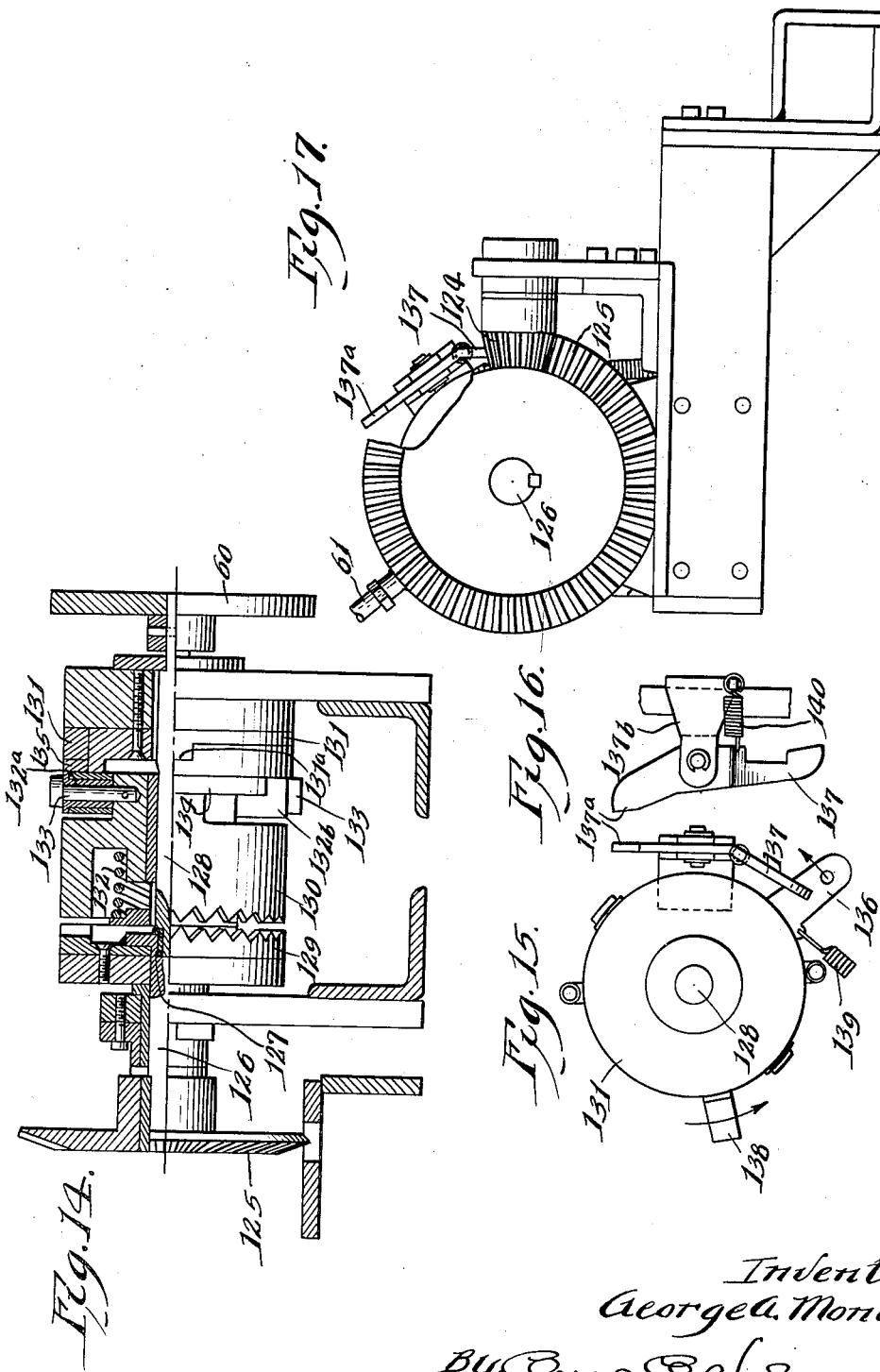

Dec. 9, 1952          G. A. MONTOOTH          2,621,045
PIN CHANGER FOR BOWLING PIN SETTERS
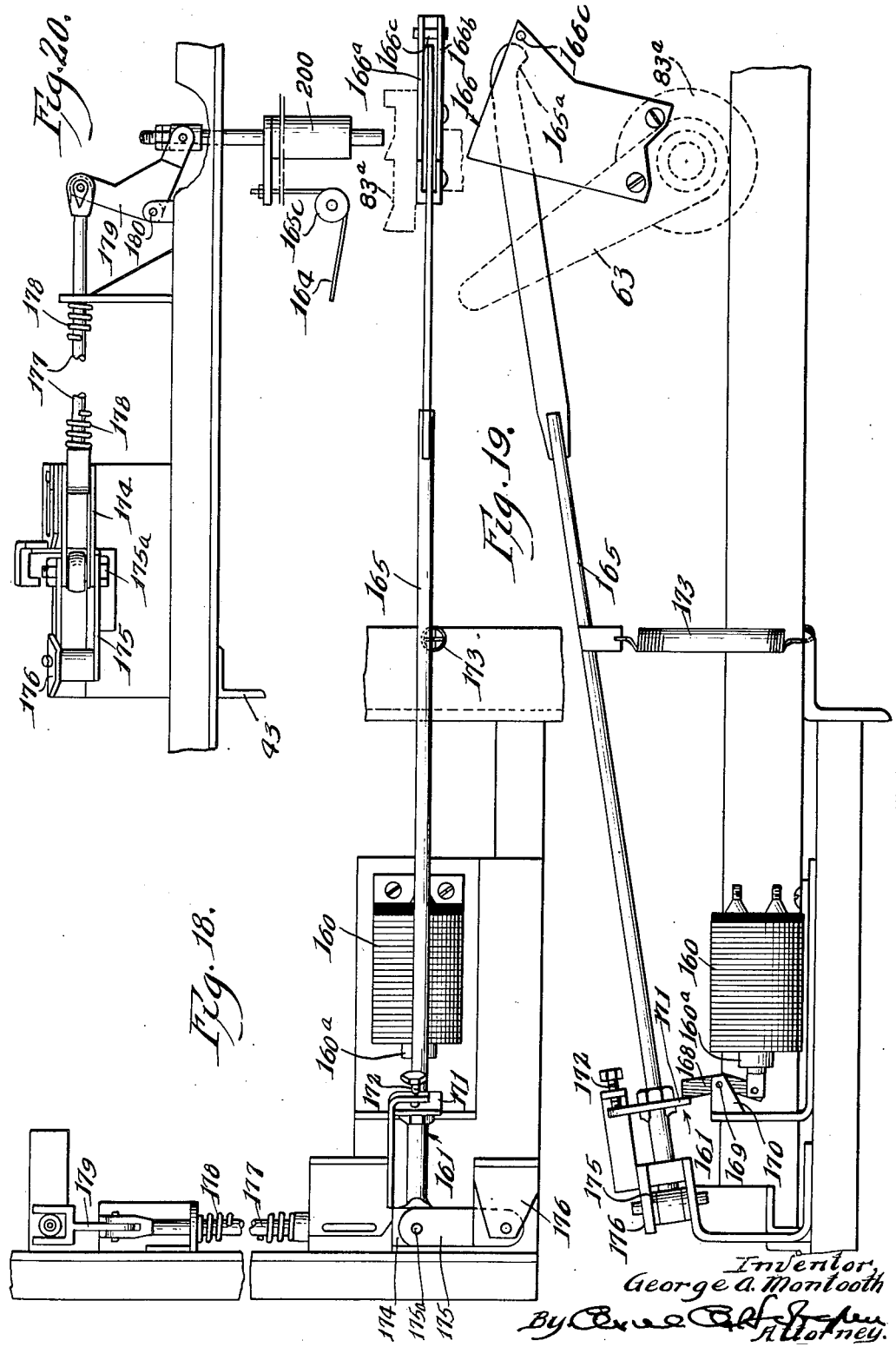

Patented Dec. 9, 1952

2,621,045

UNITED STATES PATENT OFFICE 2,621,045

PIN CHANGER FOR BOWLING PIN SETTERS

George A. Montooth, Long Beach, Calif., assignor to The Brunswick-Balke-Collender Company, Chicago, Ill., a corporation of Delaware Application March 11, 1948, Serial No. 14,357

18 Claims. (Cl. 273—43)

This invention relates to bowling pin handling apparatus, and more particularly to apparatus for changing the pins in a pin setting machine.

One object of this invention is to provide an improved mechanism for changing the entire complement of pins in a pin setting machine.

Another object of this invention is to provide an improved pin changing mechanism which may be operated to change the entire complement of pins in a pin setting machine without interrupting the normal operation of the pin setting machine and without interrupting play on the bowling alley with which the pin setting machine is associated.

Another object of this invention is to provide an improved pin changing mechanism which may be connected into the operating circuit of the pin setting machine with which the improved mechanism is associated without affecting the operating cycle of such machine, so that the pin changing mechanism need not be an integral part of the machine, but may be manufactured and sold as an accessory unit.

Another object of this invention is to provide a pin changing mechanism adapted to introduce pins into the pin setting machine with which it is associated during the normal operation of said machine and to remove pins as they pass through the machine during the normal cycle of operation of said machine.

Still another object of this invention is to provide a pin changing mechanism for a pin setting machine, said mechanism being actuated by the pins as they are removed from the machine.

A further object of this invention is to provide a pin changing mechanism which removes pins one by one from the pin setting machine and places different pins in predetermined positions in the machine.

Other objects and advantages of this invention will become apparent from the following detailed description taken in connection with the accompanying drawings, in which:

Fig. 5 is a side view of the apparatus shown in Fig. 3;

Fig. 6 is a schematic diagram showing the electrical circuit for operating the pin changing mechanism;

Fig. 7 is an elevation, partly in section of a clutch used in operating the pin changing mechanism;

Fig. 8 is a plan view of the clutch of Fig. 7;

Fig. 9 is an elevation of a modified form of pin changing mechanism, said figure being a front view looking toward the rear of the alley;

Fig. 10 is a top plan view of the apparatus shown in Fig. 9, some of the pin holding cans having been removed to show underlying parts;

Fig. 11 is a side view of the apparatus shown in Fig. 9;

Fig. 12 is an enlarged detail plan view of a portion of the drive mechanism for the pin changing apparatus shown in Fig. 9;

Fig. 13 is a side of the drive mechanism of Fig. 12.

Fig. 14 is a view similar to Fig. 13 but partly in section;

Fig. 15 is a detail view of a portion of the apparatus of Fig. 13;

Fig. 16 is a detail view of another portion of the apparatus of Fig. 13;

Fig. 17 is an end view looking from the left of Fig. 13 and partly broken away;

Fig. 18 is an enlarged plan view, partly broken away, of part of the actuating mechanism of the apparatus of Fig. 9;

Fig. 19 is a side elevation of the apparatus of Fig. 18; and

Fig. 20 is an end view partly broken away and looking from the left of the apparatus shown in Fig. 18 and turned 90 degrees for convenience of illustration.

Figure 1:
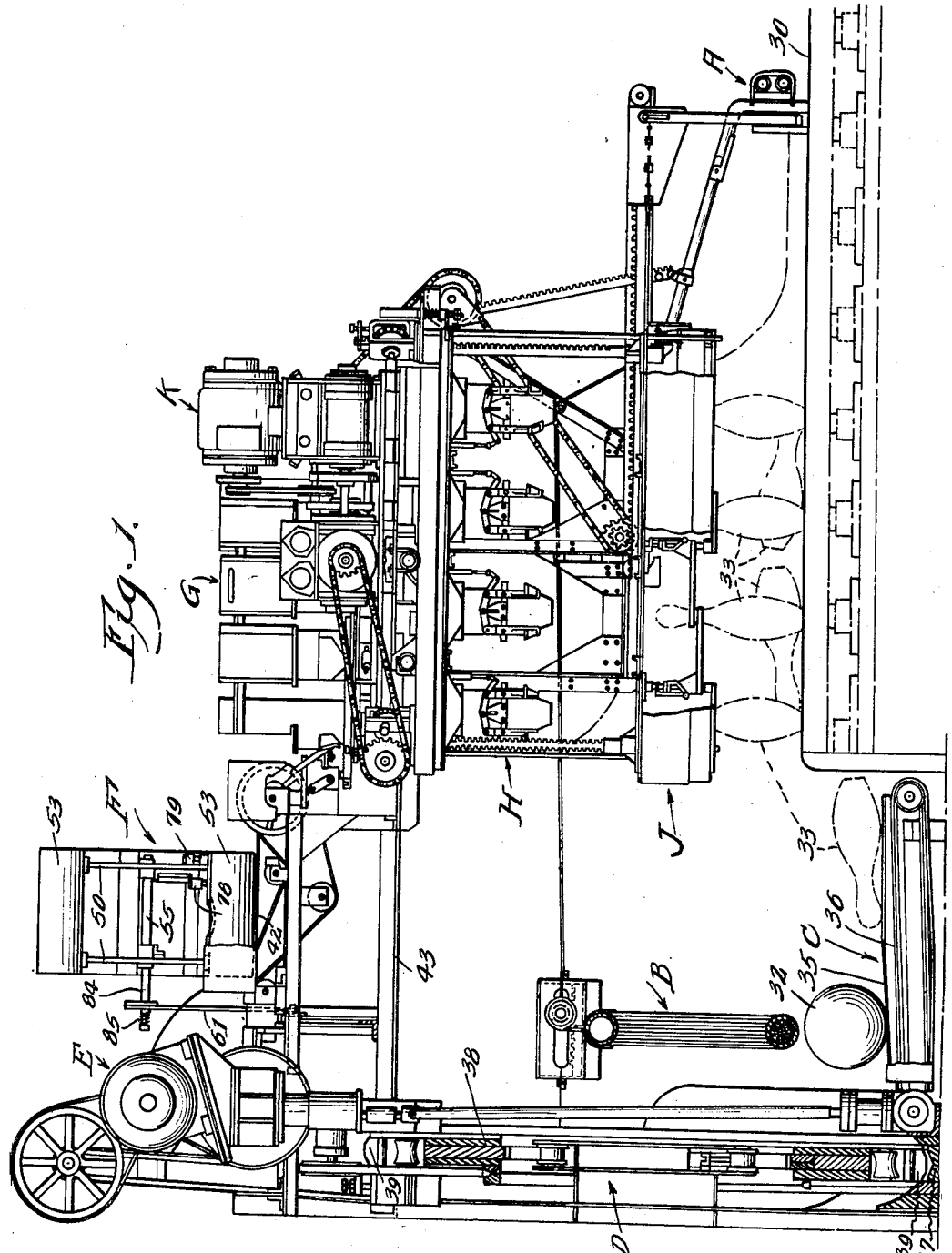
Fig. 1 is a longitudinal section through the rear portion of a bowling alley showing a side view, partly in section and partly in elevation, of a pinsetting machine having mounted thereon a pin changing mechanism constructed in accordance with my invention.
Figure 2:
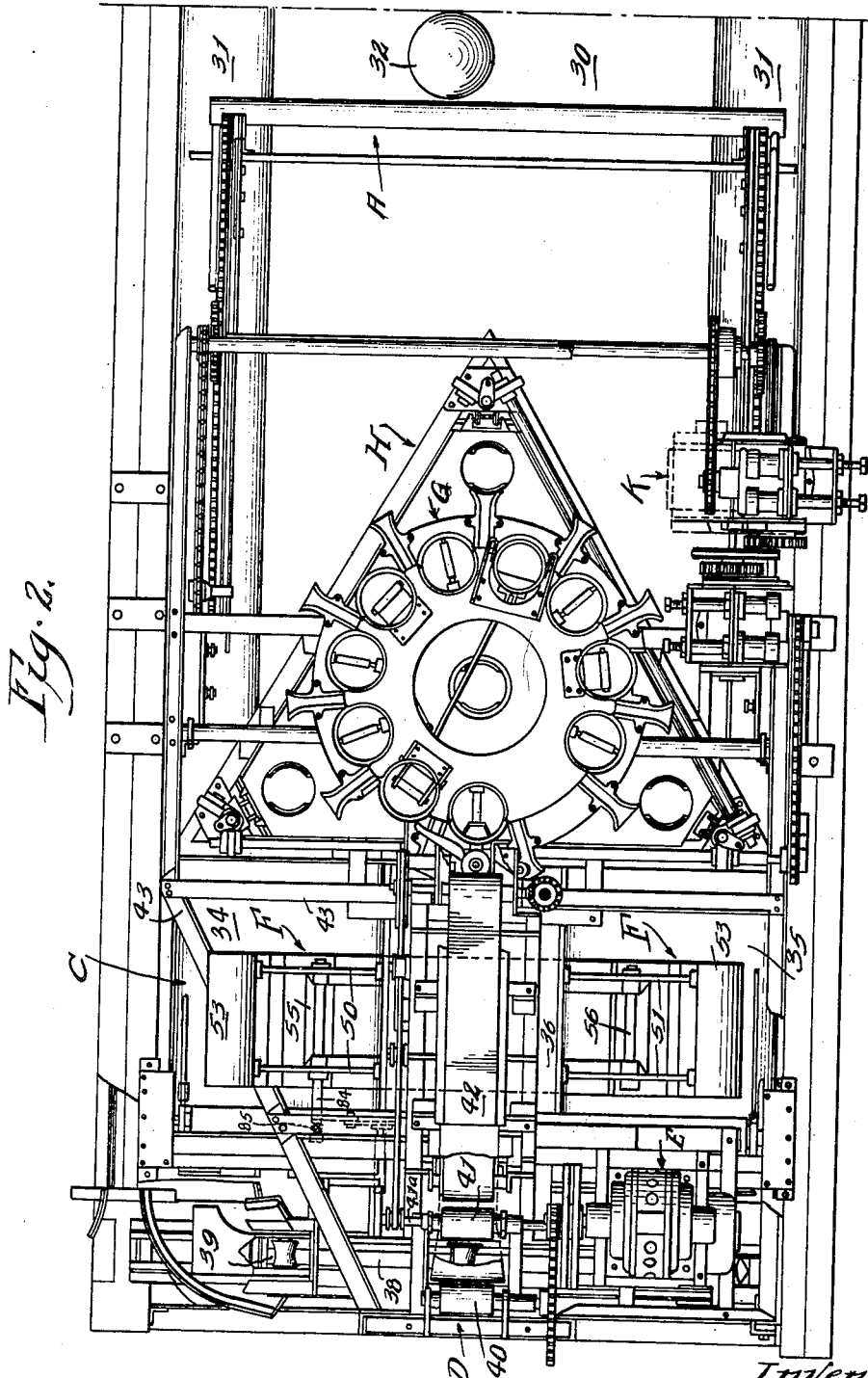
Fig. 2 is a plan view of the machine shown in Fig. 1 with part of the structure removed to show underlying parts.

While the invention is susceptible of embodiment in many different forms, there are shown in the drawings and will herein be described in detail two specific embodiments with the understanding that the present disclosure is to be considered as an exemplification of the principles of the invention and is not intended to limit the invention to the embodiments illustrated. The scope of the invention will be pointed out in the appended claims.

In my application for an automatic pinsetter filed March 24, 1947, as Serial No. 736,643, I disclosed a pin changing mechanism for automatically removing the entire complement of pins from a pin setting machine and replacing them with different pins; and in my application for bowling pin handling apparatus filed June 6, 1947, as Serial No. 752,898, I disclosed another form of pin changing apparatus.

The general combination in a bowling pin setting machine of means for supporting a reserve set of pins for substitution in the machine, means for receiving pins for transfer out of use by the machine and pin transfer mechanism is disclosed and claimed in my copending application Serial No. 736,643 entitled "Pin Setting Machine," filed March 24, 1947.

In order to operate both of these earlier pin changing mechanisms the pins in the pin setting machine were diverted from their normal path of travel through the machine, and consequently, in order to effect a pin changing operation the normal sequence of the machine was interrupted, and the game of bowling on the alley with which the pin setting machine is associated was also interrupted. Furthermore, because it was necessary to interrupt the normal sequence of operations to divert the pins from their normal course of travel, it was necessary to inter-connect the pin changing mechanism with the operating circuit of the pin setting machine, and consequently the pin changing mechanism became an integral part of the pin setting machine.

I have now devised and am herewith disclosing and claiming an improved pin changing mechanism which is not interconnected with the operating program of the pin setting machine with which it is associated, and consequently is not integral with the pin setting machine but may be maufactured and sold as an accessory unit and may be interconnected with the pin setting machine either at the time the pin setting machine is installed or at any later time, this interconnection comprising merely a preferred drive means for the pin changing mechanism and a simple auxiliary circuit. Furthermore, my improved pin changing mechanism is operable to change the complement of pins in the pin setting machine without diverting the pins from their normal course of travel and without interrupting the normal sequence of operations of the machine, the pins being removed from the machine during their normal travel through the machine, and new pins being substituted so that the operation of the machine and bowling on the alley are not interrupted.

Referring now to the drawings, the invention is illustrated as being mounted on a pinsetting machine adapted for use on an alley bed 30, the rear portion thereof comprising a pin deck and said alley having conventional gutters 31 associated therewith and having at the rear thereof a conventional pit. Said machine comprises a supporting framework 43 and various ball and pin gathering mechanisms including a sweep and guard mechanism designated generally at A; a movable pit cushion which is operatively connected with the sweep and guard mechanism and is designated generally at B; a conveyor system on the floor of said pit, this conveyor system being designated generally at C and being operative to move the ball and pins which have fallen from the pin deck into the pit to the rear of said pit cushion; and a ball and pin elevating system designated generally at D, this system including means for moving the ball and pins to an elevated position behind the cushion, means for removing said ball to a ball return track, means for elevating the pins and arranging said pins in a desired manner, and means above said pit for conveying the pins across the pit to a position above the pin deck.

Means for driving the mechanisms C and D are designated generally at E, this means also serving to provide power for the pin changing mechanism F and for indexing a rotary pin magazine G to which pins are fed by the pin gathering means above described. From the magazine G the pins are delivered to a pinsetting mechanism H which is positioned above the pin deck of the alley bed 30 and is operable to descend through a pin pickup mechanism J to set pins on said pin deck. Power to operate the guard and sweep, pinsetting and pickup mechanisms is derived from a power arrangement K comprising a motor, a transmission and other drive connections.

Inasmuch as the machine illustrated is described in detail in certain copending applications, including the application of George A. Montooth, filed January 14, 1948, as Serial No. 2,205, and the application of George A. Montooth and William J. Schlitt, Jr., filed March 11, 1948, as Serial No. 14,358, the complete operation of the machine will be described only briefly here.

With the machine positioned as shown in Fig. 1 a ball 32 has been rolled, knocking down some of the pins 33. Some of the fallen pins or dead wood have remained on the pin deck and other of the fallen pins have been knocked into the pit. At the particular point in the cycle of the machine illustrated in such figure, the sweep and guard A have been lowered from an upper rest position to an operative position adjacent the alley bed, the swinging pit cushion B has been elevated to permit the passage of the ball and pins therebeneath, and the pickup mechanism J has descended and is about to pick up the standing pins so that the alley bed may be swept clear of dead wood.

The cycle of operation of the machine may have been initiated in any one of a number of ways, as for example by placing one or more light beams in the path of the ball so that interruption of said light beams by the ball causes actuation of a switch to start the cycle of operation; or, preferably, in the particular machine illustrated the cycle of operation may have been initiated by the weight of the ball in the pit, one or more switch panels being positioned in the pit and being operated by the weight of the ball on the conveyor system C to start a cycle of operation. In any event, once started, the machine is designed to continue its cycle of operation to pick up the standing pins, sweep the dead wood from the alley, replace the standing pins thereon, return the ball 32 to the player's end of the alley and gather the pins from the pit preparatory to placing a new set of pins on the pin deck. After a second ball is rolled the alley is swept and a new set of pins is placed in position on the pin deck.

In the event the first ball has knocked down all of the pins the pickup operation is dispensed with and the alley is swept and a new set of pins is placed in position. Should the first ball miss the pins, as by rolling down the gutter, the pins are left on the alley in readiness for the second ball. The operation of the machine through its various cycles is described in detail in the application of George A. Montooth and William J. Schlitt, Jr., Serial No. 14,358, above referred to.

The conveyor system C on the floor of the pit comprises a pair of endless belts 34 and 35, extending from opposite sides of the pit and running towards the center thereof, and a third endless belt 36 extending longitudinally of the pit in the center thereof and running toward the rear of the pit. These belts, together with the rest of the ball and pin handling mechanisms in the pit, run continuously, being driven by the drive mechanism E. The two transverse belts 34 and 35 deliver the ball and pins to the center belt 36, and said center belt carries the ball and pins beneath the pit cushion B and to the rear of the pit. At the rear of the pit the ball and pins are carried by the belt 36 onto an arcuate wooden track 37 which acts to guide the ball and pins into engagement with a rotatable conveyor and sorter wheel 38 which is rotatable about an axis extending longitudinally of the pit. About the periphery of the wheel 38 are a plurality of recesses for engaging the ball and a plurality of paddle members 39 for engaging the pins. As the wheel rotates the ball is picked up in one of said recesses and the pins are picked up one by one by engagement with the paddle members 39 and are elevated above the pit.

After a portion of the cycle of rotation of the wheel 38, the ball is removed from the wheel, while the pins are carried on up to the top of the wheel where they are engaged between two vertically travelling belts 40 and 41 which elevate the pins to a further point above the alley and deliver them butt end first to a transverse or crossover conveyor comprising an endless belt 42. This conveyor belt carries the pins butt end first forwardly over the pit to a position above the alley bed and deposits them in the rotary magazine G. When the magazine G is loaded with a full complement of ten pins and when the pinsetting mechanism H is empty and is in a position to receive pins, the pins are delivered from the magazine G to the pinsetting mechanism H, and at the completion of a bowling frame the pinsetting mechanism is lowered down through the pickup structure and sets a new group of pins on the pin deck. In order to insure that in the event of a strike wherein all ten pins on the pin deck are knocked down, there is a new set of ten pins waiting in the pinsetting mechanism H, the machine illustrated preferably utilizes a full complement of twenty pins.

Frequently it is desirable to exchange the entire complement of pins for different pins, and to accomplish this desired end my improved pin changing mechanism F is mounted on the machine. For example, it may be desirable to switch the alley from open bowling to league or tournament play, in which event, new pins are usually required. As will hereinafter appear, my improved pin changing mechanism is designed to remove a full complement of twenty pins from the machine and to substitute different pins in the machine, this action occurring during a normal pinsetting cycle of the machine without interruption of the normal sequence of operation of the machine and without interrupting play on the alley.

Figure 3:
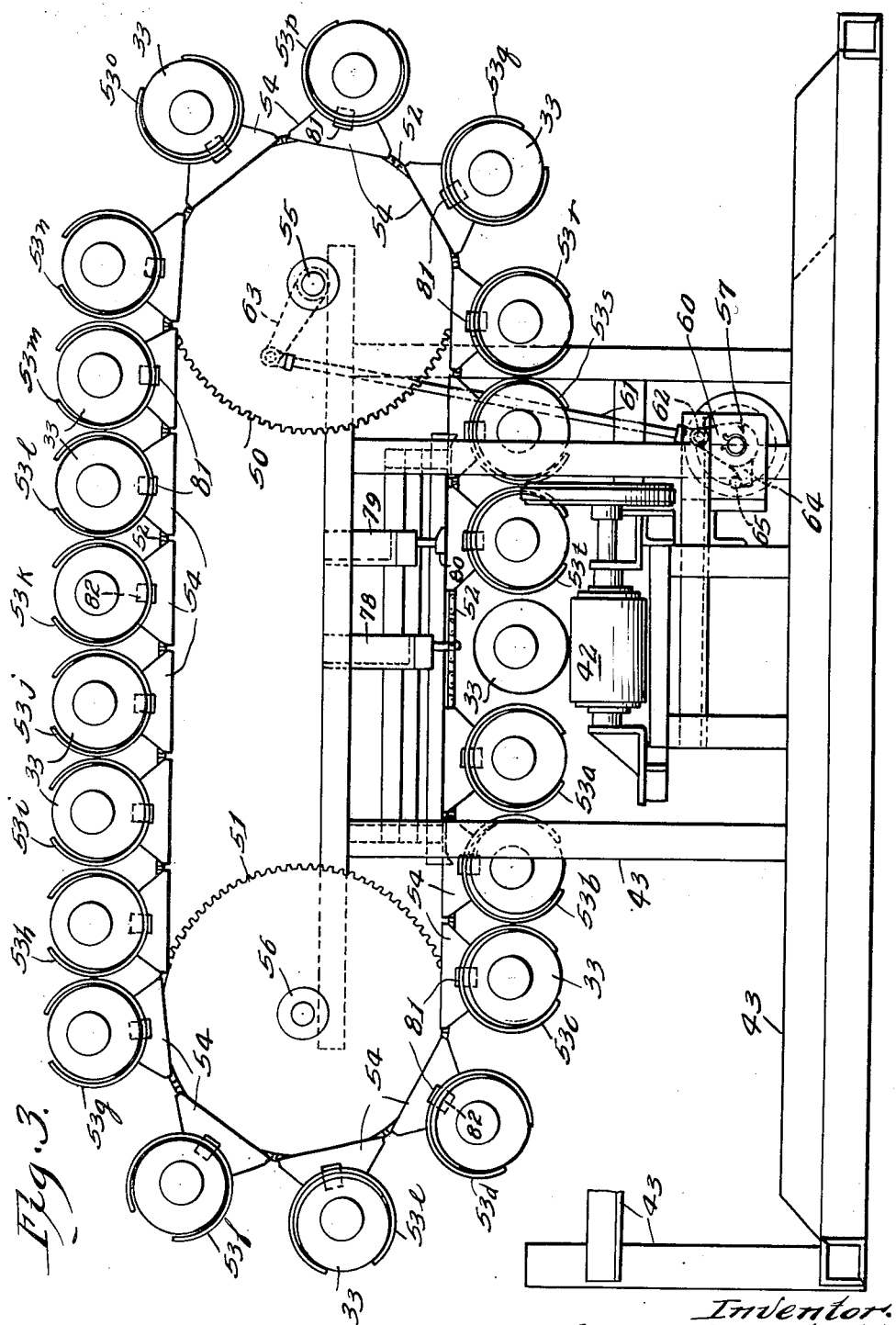
Fig. 3 is an enlarged elevation of a pin changing mechanism constructed in accordance with my invention, said figure being a front view looking toward the rear of the alley.

Referring now more particularly to Fig. 3 wherein the preferred embodiment of the invention is illustrated, the pin changing mechanism comprises a rotatable pin magazine mounted over the pit above the conveyor belt 42 and on the frame 43, together with intermittently operable means for rotating said magazine in a direction transverse to the direction of travel of pins on said conveyor 42 successively to remove pins from the conveyor 42 and to substitute therefor pins from the pin changing magazine.

The magazine comprises a pair of drive sprockets 50 on a shaft 55 and a pair of driven sprockets 51 on a shaft 56, said sprockets being interconnected by a pair of endless chains 52. These chains, which comprise the periphery of the rotatable magazine are divided into 21 equal spaces, and 20 pin holding devices illustrated as cans 53a–t are mounted between the chains 52 on brackets 54, and the entire assembly is mounted to rotate about an axis located above the conveyor 42 and extending parallel to the direction of movement of said conveyor so that as the magazine rotates each of the cans 53 passes over said conveyor belt closely adjacent said belt. As shown best in Fig. 3, each of the cans 53 has a portion of its wall directly opposite the bracket 54 cut away. The width of this cut away portion and the distance between the can 53 and conveyor 42 when the can passes immediately over said conveyor are so arranged that when a bowling pin is in one of the cans 53 and said can moves along the lower run of travel of the magazine, the belly portion of the pin in the can extends below the periphery of the can and engages the conveyor 42 so that the pin is carried out of the can by said conveyor.

During the normal operation of the pinsetting machine with which my pin changing mechanism is associated, the pin changing mechanism is arranged in the position shown in Fig. 3 with the blank space in the chains 52 from which a can 53 has been omitted being immediately over the crossover conveyor 42 so that pins may pass along said conveyor without interference from the pin changing mechanism during the operation of the machine in a game of bowling. When it is desired to change the complement of pins handled by the machine, the operator or alley attendant may operate a switch to cause the pin changing mechanism to go into operation. It is preferable for the attendant to actuate the pin changing apparatus only when there are ten pins in position upon the alley bed and ten pins in the pin setting mechanism H of the pinsetting machine so that the pinsetting machine is inactive and is not completing a cycle of operation. This procedure is preferable since it insures that the pin changing mechanism will not be actuated during a cycle of operation of the pinsetting machine. If the pin changing mechanism were actuated during the course of a cycle of operation of the machine, it is possible that part of the pins in the machine would already have passed over the crossover conveyor 42 into the magazine G of the machine.

Closure of the attendant's switch causes the pin changing mechanism to index one space (counterclockwise as the parts appear in Fig. 3) so that the pin holding can 53a is moved to a position immediately over the conveyor 42. As indicated earlier, the conveyor 42 carries the pin out of the can 53a and deposits said pin in the magazine G. It is preferable to avoid operation of the pin changing mechanism after the pinsetting machine has been started on a pin setting cycle of operation. This cycle of operation may be performed by the player bowling two balls or by getting a strike on the first ball. This method of actuating the pinsetting machine merely causes the machine to complete a pinsetting operation, and it is not necessary to interrupt the normal power circuits controlling the pinsetting machine.

As the machine continues through two pin setting cycles of operation by the bowling of two frames, the alley will be swept free of pins and the pins in pin setting mechanism H will be set on the alley bed to be swept into the pit during the first pinsetting cycle so that during these two pinsetting cycles a complete complement of 20 pins within the machine will be brought up one by one on to the conveyor 42, and each pin will enter an empty can 53 which is immediately above the conveyor 42. Means are provided to cause the entry of a pin into an empty can to index the pin changing mechanism one space, and this procedure is continued until all 20 pins which were originally in the machine have been removed from the machine and replaced by the 20 pins which originally were in the pin changing magazine. During the second pinsetting cycle ten new pins will be placed on the alley bed. When the pin changing magazine has been indexed 21 times (including the first time which was done by the operator or alley attendant to initiate the pin changing cycle) the blank space in the chains 52 is again immediately over the conveyor 42 and the pin changer becomes inoperative, pins then traveling through this blank space and into the magazine G when the machine is operated. In order to accomplish the operation described above, a one revolution clutch is provided, this clutch serving to index the pin changing mechanism through one space each time it is actuated.

Figure 4:
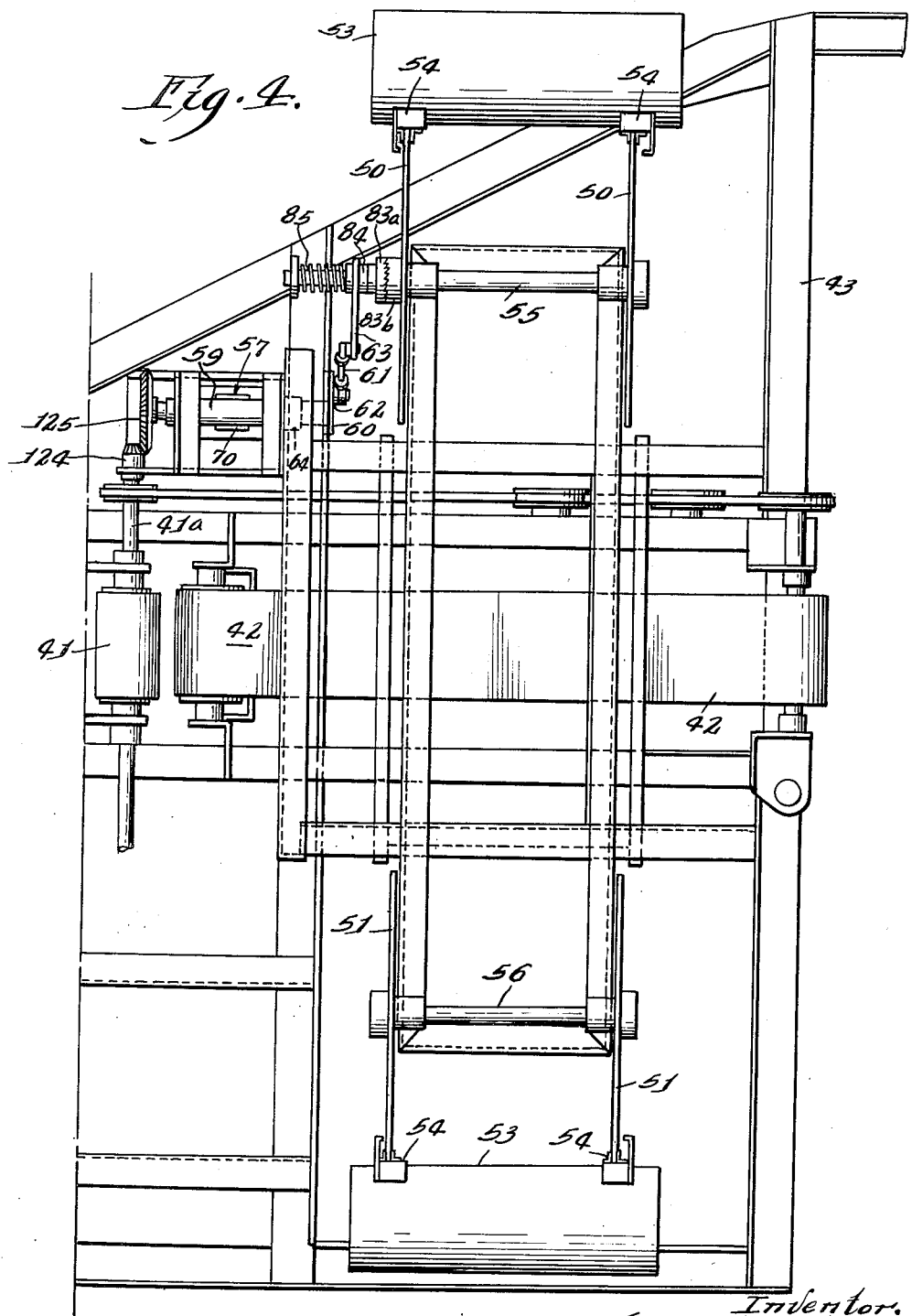
Fig. 4 is a top plan view of the apparatus shown in Fig. 3, some of the pin holding cans having been removed to show underlying parts.

The clutch mechanism is designated generally at 57 in Figs. 3, 4 and 5 and is shown in detail in Figs. 7 and 8.

The clutch is arranged to be driven by a continuously rotated shaft 41a, being connected to this shaft by any conventional connecting means, as a pair of bevel gears 124 and 125. Referring more particularly to Figs. 7 and 8, the bevel gear 125 is non-rotatably mounted on a shaft 59, this shaft being driven continuously. A crank arm 60 is loosely rotatably mounted on the end of the shaft 59, this crank arm carrying a connecting rod 61 which is pivotally joined at 62 to the crank arm 60 and is pivotally joined at its other end to a lever arm 63 associated with the magazine drive shaft 55. A spring block 64 is rotatably mounted on the shaft 59 in spaced relation to the crank arm 60, this spring block normally being held against rotation with the shaft 59 by a stop pin 65. A spring collar 66 is pinned to the shaft 59 to provide a bearing and spacing means for the members 60 and 64, and a helical spring 67 loosely surrounds the collar 66. One end of this spring is attached to the crank arm 60 at 67a (Fig. 7) and the other end of the spring is secured to the spring block 64 at 67b. During the normal operation of the apparatus, the stop pin 65 in the path of the spring block 64 prevents the spring 67 from gripping the collar 66 so that the crank arm 60 is stationary.

Solenoid 70 has a core 71 which carries the stop pin 65, a spring 72 on said core normally urging the core out of the solenoid so that the stop pin 65 engages the spring block 64 as shown in Fig. 7. However, when solenoid 70 is energized, the core 71 moves into the solenoid and the stop pin 65 moves to the left (Fig. 7) out of engagement with the spring block 64, thus allowing the spring 67 to wrap around and tightly engage the spring collar 66. Since the collar 66 is pinned to the shaft 59, the spring 67 transmits power to the crank arm 60 so that said arm rotates in a clockwise direction as the parts appear in Fig. 3. The actuating mechanisms are so arranged that the solenoid 70 is only momentarily energized and is almost immediately deenergized so that the spring 72 quickly returns the stop pin 65 to its stopping position, and after one revolution the spring block 64 is stopped by engagement with the pin 65, the spring 67 unwraps slightly from the collar 66, and the crank arm 60 ceases rotation until the next time the solenoid 70 is energized.

Fig. 6 shows an electrical circuit for operating the pin changing mechanism, this circuit being connected across two lead wires 75 and 76 which carry the control voltage used in the operation of the pinsetting machine. One terminal of the solenoid 70 is connected to one of the lead wires (the negative wire 76 as illustrated) and the other terminal of the solenoid is connected to one terminal of each of switches 77 and 78 which are arranged in parallel. The switch 77 is a normally open switch, preferably of the push-button type, and is located at the attendant's desk, this being the switch above referred to which initiates the pin changing cycle. The switch 78 is also a normally open switch and is arranged to be actuated by pins during the pin changing cycle. The other terminal of the switch 77 is connected to the lead wire 75 through two normally closed contacts of a double pole switch 79 and the other terminal of the switch 78 is connected to the lead 75 through two normally open contacts of the switch 79. This switch is arranged to be operated by an actuating block 80 carried on the bracket 54 which carries the pin holding can 53t (see Fig. 3).

It will be seen from Fig. 6 that closure of the attendant's switch 77 will energize the solenoid 70 only when the lower contacts of the switch 79 are closed, this being the position of such switch during normal operation of the pin setting machine when the pin changing mechanism is inoperative since these contacts are held closed by the actuating block 80 when the pin changing magazine is in its normal inoperative position. However, after the magazine has indexed one space, these lower contacts of the switch 79 will be opened and will remain open until the pin changing mechanism has completed 21 indexing operations so that the actuating block 80 again engages the actuating member of the switch 79 to close the lower contacts of this switch. Conversely the upper contacts of the switch 79 are open when the pin changing mechanism is in its normal position as shown in Fig. 3 so that accidental closure of the pin actuated switch 78 will have no effect on the apparatus. However, after the pin changing mechanism has indexed one space, the actuating cam 80 moves away and allows the upper contacts of the switch 79 to close so that each time the switch 78 is closed by the entry of a pin into one of the cans 53a–t the solenoid 70 is energized.

As shown in Fig. 5, each of the cans 53a–t is equipped with a push bar 81 which is actuated by a spring member 82 extending in the path of a pin in the can 53. Whenever a pin 33 enters the can 53, the belly portion of the pin engages the spring 82 so that the push bar 81 is forced upwardly to close the switch 78 and energize the solenoid 70. The belt 42 carries the pin to a position in the can wherein the belly of the pin does not engage spring 82 prior to complete movement of the can away from belt 42 in response to energization of solenoid 70.

As pointed out earlier, each time the solenoid 70 is energized, the clutch 57 makes one complete revolution and the crank arm 60 rotates clockwise as the parts appear in Fig. 3. As the crank arm rotates through a complete revolution, the connecting rod 61 is moved first downward and then upward to its initial position, causing the lever arm 63 to pivot about the shaft 55 first downward and then upward. Referring to Fig. 5, a pair of ratchet members 83a and 83b form the drive mechanism for the sprockets 50. The lever arm 63 is pinned to one end of a collar 84 which is rotatably mounted on the shaft 55 and the other end of which carries a driving member 83a of the ratchet. During the downward stroke of the connecting rod 61 and lever 63 the teeth of the ratchet driving member 83a engage the teeth of the driven ratchet member 83b which is pinned to the shaft 55 so that the shaft 55 is caused to rotate and the pin changing magazine indexes one space. On the return or upward stroke of the connecting rod 61 and lever 63 a spring 85 yields to permit the ratchet members 83a and 83b to disengage so that the magazine is not indexed in the reverse direction. The tension of spring 85 is such as to hold ratchet members 83a and 83b together when the teeth of the ratchet members mesh but is not sufficient to prevent the teeth of ratchet 83a overriding the teeth on ratchet 83b on the return stroke of rod 61 when a much greater force is exerted against the spring.

Another embodiment of my invention is illustrated in Figs. 9-20. A clutch mechanism generally designated at 123 is operable to drive the pin changing mechanism intermittently. As illustrated in Fig. 10, one element 129 of this clutch is connected to and driven by the shaft 41a which drives the vertical conveyor 41. A bevel pinion 124 is mounted on the shaft 41a and engages a bevel gear 125 which is nonrotatably mounted on shafting 126 on which is mounted the driving element 129 of the clutch mechanism 123.

Referring now to Figs. 12-17 and particularly to Fig. 14, the shaft 126 terminates in an end bearing 127 which acts as a bearing for the end of a coaxial shaft 128, the shaft 126 being free to rotate without rotating the shaft 128. A toothed driving clutch element 129 is keyed to the shaft 126, and a complementary toothed driven clutch element 130 is slidably but nonrotatably mounted on the shaft 128, the clutch element 130 being adapted to move into engagement with the element 129 through force exerted by a cam ring 131. A spring 132 normally urges the clutch element 130 to the right (in Fig. 14) out of engagement with the driving clutch element 129.

The rear face of the driven element 130 carries two oppositely disposed rollers 132a and 132b, these rollers being mounted on the element 130 by means of studs 133, and normally resting in notches 134a of a roller plate 134. The cam ring 131 carries slanting lugs 131a which mesh with cooperating slanting notches in an engaging ring 135 which is slidable on the roller plate 134 so that when the cam ring 131 is caused to turn counterclockwise (as the parts appear in Fig. 15) by a pull on a lever arm 136 which is rigidly attached to cam ring 131, the engaging ring 135 moves to the left (in Figs. 12, 13 and 14) pushing the rollers 132a and 132b out of the notches 134a, and moving the driven member 130 into engagement with the rotating driving member 129. As the rollers 132a and 132b begin rotating with member 130, they move away from the notches and roll along the flat face of the roller plate 134, thus holding the clutch engaged.

Since there are two oppositely disposed rollers 132a and 132b and two notches 134a set at an angle of 180° to each other, the clutch normally would be disengaged after one-half revolution. However, the apparatus is so arranged that the clutch must rotate 360° or one complete turn before disengaging, and therefore a latch 137 is provided to engage the lever 136 and hold the clutch engaged until it has turned more than 180°. When the clutch has turned beyond one-half turn so that the rollers 132a and 132b have passed the notches 134a, a latch releasing arm 138 (Fig. 15) which rotates with the driven element 130, strikes the latch at the point 137a, causing it to pivot about its mounting on bracket 137b to release position and allowing the spring 139 to return the cam ring 131 to its normal position so that the clutch is disengaged after one complete turn, the spring 132 forcing the rollers 132a and 132b back into the notches 134a, and a spring 140 returning the latch 137 to engaging position.

The crank disk 60 is keyed or otherwise fixedly mounted on the end of the shaft 128, this disk having an eccentric connection at 62 with the connecting rod 61 which is pivotally connected at its other end to the lever arm 63 which actuates a ratchet assembly intermittently to drive the pin changing mechanism.

The pin changing mechanism may be actuated by closure of the switch 77 above mentioned which energizes a solenoid 160 in the manner previously described with reference to solenoid 70 of the first embodiment described herein which releases a trip mechanism designated generally at 161, this mechanism actuating the indexing member 200 which is connected to a clutch engaging lever 136 by means of a cable 164 which is led from the member 200 to the lever over sheaves 165a, 165b and 165c. Actuation of the lever 136 causes the clutch members 83a and 83b to move together and the magazine is indexed one space so that the first can 53a moves over the conveyor. When the belly of the pin 33 which protrudes out of the cutout portion of the can contacts the conveyor 42, the pin is carried endwise out of the can and is delivered by the conveyor 42 to the pin setting mechanisms of the machine. While the empty can remains directly over the conveyor 42 it is in a position to receive the first pin which is delivered by the machine to the conveyor 42, since the can does not move until a pin inserted therein actuates member 200 through spring 82.

I prefer to provide another switch (see 79 in Fig. 6) which is in series with the solenoid 160 and is opened by this first indexing operation and held open until all 20 cans of the pin changer magazine have passed across the conveyor 42, thereby making it impossible to energize the solenoid 160 again until the pin changing mechanism has removed the entire complement of pins from the pin setting machine and replaced them with a new complement of pins, thus eliminating the possibility of the operator or attendant erroneously indexing the pin changing mechanism during its normal automatic cycle of operation.

As will be described in greater detail hereafter, the trip mechanism 161 is automatically recocked so that it is ready for the next pin changing cycle. The trip mechanism remains cocked through the balance of the automatic pin changing cycle, each subsequent indexing operation being initiated by the entry of a pin from the conveyor 42 into the can 53 which is immediately over the conveyor 42.

The trip mechanism above referred to is illustrated in Figs. 18 and 19. A rod 165 provides a connection between the trip mechanism and a U-shaped lever arm 166 which rotates with the ratchet lever 63. The lever 166 has two side plates 166a and 166b extending from a base as shown in Fig. 18 and a center cam hooking portion 166c which is adapted to engage an end portion 165a of the rod 165, move said rod and then slide past the rod in one direction, and in the other direction to just engage and slide past the rod. This is because portion 165a has a flat side which engages and holds portion 166c until rod 165 is prevented from further movement by a pair of links 174 and 175 whose main function is set forth hereinafter. The rod 165 then moves above portion 166c and said portion moves beyond portion 165a. On the return of portion 166c, it engages the rounded side of portion 165a and the rod 165 moves up to allow portion 166c to move on. When the trip mechanism becomes uncocked the rod 165 moves to the left (in Figs. 18 and 19), the magazine is indexed, and the lever arm 166 pivots counterclockwise, the hooking portion 166c engaging the end 165a of the rod 165. The rod 165 is cammed upwardly by the portion 166c and then returned by the spring 173. On the return stroke of the lever 166 the arm 165 is pulled to the right, recocking the trip mechanism ready for the next pin changing cycle. This trip mechanism remains cocked during the entire automatic pin changing cycle and is only uncocked at the beginning of the succeeding pin changing cycle by the action of the solenoid 160.

When the operator or attendant presses the switch 77 which energizes the solenoid 160, the solenoid core 160a is drawn into the solenoid, carrying with it the lower end (in Fig. 19) of an actuating arm 168 which is pivotally mounted at 169 on a bracket 170. The upper end of the actuating arm 168 is in engagement with an actuating plate 171 carried by the rod 165, so that the rod 165 is urged to the left. A set screw 172 which engages the plate 171 limits the return movement of the plate 171, and a spring 173 serves to tension the member 165 in its proper position against the base portion of the lever 166. When the rod 165 is urged to the left it forces a strut comprising a pair of pivotally joined links 174 and 175 to buckle. These links normally are cocked so that their point of pivotal connection 175a is slightly to the right of a straight line drawn between their opposite ends, the opposite end of the link 175 being shown as pivotally affixed to a bracket 176, and the opposite end of link 174 being pivotally joined to the end of a rod 177. As may be seen in Fig. 18, when the links buckle the rod 177 is moved by force exerted by the spring 178 which is mounted on rod 177 between a collar mounted thereon and a portion of the machine frame through which rod 177 slides. The other end of the rod 177 is connected to one arm of a bell crank 179 which is pivotally mounted at 180, the other arm of this bell crank being connected to the actuating portion of member 200. The cable 164 inter-connects the member 200 and the clutch 123 so that the clutch is engaged each time the member 200 is actuated, and the rod 165 is engaged by the arm portion 166c and returned to its original position so that the links 174 and 175 are returned to their original cocked position, compressing the spring 178, and energy is stored in the spring 178 for the next operation.

The first indexing operation is thus accomplished through energization of the solenoid 160 by the attendant or operator. After the first indexing operation the member 200 is operated each time a pin is carried by the conveyor 42 into one of the cans 53a-t of the pin changing magazine.

I claim:

1. Pin changing apparatus for a pin setting machine having a pin conveyor along which pins travel during a normal operating cycle of said machine, comprising, in combination, a rotatable pin magazine having its periphery divided into a plurality of equal spaces, a plurality of open ended pin holding devices, each being horizontally disposed and adapted to hold one pin and each being mounted on said magazine in one of said spaces, there being one more of said spaces than there are devices to provide a position wherein all the devices are out of the path of travel of pins on said conveyor, said magazine being in its normal stopped position when said blank space is adjacent said conveyor and each of said devices having a cutout portion, a one-revolution clutch connected to said magazine for rotating said magazine in a direction transverse of the direction of travel of pins on said conveyor each rotation of the clutch causing the magazine to rotate through a portion of a revolution successively to position each of said devices successively adjacent said conveyor with the open ends in the path of pins thereon to cause the pin in the device adjacent said conveyor to engage said conveyor through said cutout portion and be removed through one of said ends from said device on said conveyor and to cause a pin traveling on said conveyor during said normal operating cycle to enter said device through the other of said ends, a solenoid for actuating said clutch, a first means for energizing said solenoid, this first means comprising a first normally open switch and a manually operable switch in series, an actuating member carried by one of said devices, said member being adapted to engage and close said normally open switch when said magazine is in its normal stopped position and when said member reaches said position at the end of each revolution of said magazine, a second means for energizing said solenoid, said second means comprising a second normally open switch adjacent said conveyor and a normally closed switch in series therewith, said normally closed switch being adapted to be opened by said actuating member when said magazine is in its normal rest position to break the solenoid circuit and stop rotation of the magazine, and a pin operated actuating member on each of said devices, each such member being moved by engagement with a pin entering said device to close said second normally open switch.

2. Pin changing apparatus for a pin setting machine having a pin conveyor along which pins travel during a normal operating cycle of said machine, comprising, in combination, a rotatable pin magazine having its periphery divided into a plurality of equal spaces, a plurality of open ended pin holding devices each adapted to hold one pin and each mounted on said magazine in one of said spaces, there being one more of said spaces than there are devices to provide a position wherein all the devices are out of the path of travel of pins on said conveyor, said magazine being in its normal stopped position when said blank space is adjacent said conveyor, and each of said devices having a cutout portion, intermittently operable means for rotating said magazine in a direction transverse of the direction of travel of pins on said conveyor, each operation of such means causing the magazine to rotate through a portion of a revolution successively to position each of said devices successively adjacent said conveyor with the open ends in the path of pins thereon to cause the pin in the device adjacent said conveyor to engage said conveyor through said cutout portion and be removed through one of said ends from said device on said conveyor and to cause a pin traveling on said conveyor during said normal operating cycle to enter said device through the other of said ends, a solenoid for actuating said intermittently operable means, a first means for energizing said solenoid, this means including a manually operable, normally open switch, an actuating member on said magazine, a second means for energizing said solenoid, said second means comprising a second normally open switch adjacent said conveyor and a normally closed switch in series therewith, said normally closed switch being adapted to be opened by said actuating member when said magazine is in its normal stopped position and when said member reaches said position at the end of each revolution to break the solenoid circuit and stop revolution of the magazine, and a pin operated actuating member on each of said devices, each such member being moved by a pin entering said device from said conveyor to close said second normally open switch.

3. Pin changing apparatus for a pin setting machine having a pin conveyor along which pins travel during a normal operating cycle of said machine, comprising, in combination, a rotatable pin magazine having its periphery divided into a plurality of equal spaces, a plurality of open ended pin holding devices, each being horizontally disposed and adapted to hold one pin and each being mounted on said magazine in one of said spaces, there being one more of said spaces than there are devices to provide a position wherein all the devices are out of the path of travel of pins on said conveyor, said magazine being in its normal stopped position when said blank space is adjacent said conveyor and each of said devices having a cutout portion, a one-revolution clutch connected to said magazine for rotating said magazine in a direction transverse of the direction of travel of pins on said conveyor, each rotation of the clutch causing the magazine to rotate through a portion of a revolution successively to position each of said devices successively adjacent said conveyor with the open ends in the path of pins thereon to cause the pin in the device adjacent said conveyor to engage said conveyor through said cutout portion and be removed through one of said ends from said device on said conveyor and to cause a pin traveling on said conveyor during said normal operating cycle to enter said device through the other of said ends, a solenoid for actuating said clutch, a first means for energizing said solenoid, this first means comprising a first normally open switch and a manually operable switch in series, an actuating member carried by one of said devices, said member being adapted to engage and close said normally open switch when said magazine is in its normal stopped position and when said member reaches said position at the end of each revolution of said magazine, a second means for energizing said solenoid, said second means comprising a second normally open switch adjacent said conveyor, and a pin operated actuating member on each of said devices for briefly closing said second normally open switch upon the entry of a pin from said conveyor into said device.

4. Pin changing apparatus for a pin setting machine having a pin conveyor along which pins travel during a normal operating cycle of said machine, comprising, in combination, a rotatable pin magazine having its periphery divided into a plurality of equal spaces, a plurality of open ended pin holding devices each adapted to hold one pin and each mounted on said magazine in one of said spaces, there being one more of said spaces than there are devices to provide a position wherein all the devices are out of the path of travel of pins on said conveyor, said magazine being in its normal stopped position when said blank space is adjacent said conveyor, and each of said devices having a cutout portion, intermittently operable means for rotating said magazine in a direction transverse of the direction of travel of pins on said conveyor, each operation of such means causing the magazine to rotate through a portion of a revolution successively to position each of said devices successively adjacent said conveyor with the open ends in the path of pins thereon to cause the pin in the device adjacent said conveyor to engage said conveyor through said cutout portion and be removed through one of said ends from said device on said conveyor and to cause a pin traveling on said conveyor during said normal operating cycle to enter said device through the other of said ends, a solenoid for actuating said intermittently operable means, manual means for briefly energizing said solenoid, and pin actuated means for briefly energizing said solenoid, said pin actuated means comprising a normally open switch adjacent said conveyor and connected to said solenoid, and means on each of said devices operable upon entry of a pin briefly to close said switch.

5. Pin changing apparatus for a pin setting machine having a pin conveyor, comprising, in combination, a rotatable pin magazine having its periphery divided into a plurality of equal spaces, a plurality of open ended pin holding devices each adapted to hold a pin and each mounted on said magazine in one of said spaces, there being one more of said spaces than there are devices to provide a position wherein all the devices are out of the path of travel of pins on said conveyor, said magazine being in its normal stopped position when said blank space is adjacent said conveyor, and each of said devices having a cutout portion, an intermittently operable clutch connected to said magazine for moving said magazine through a portion of a revolution upon each operation successively to position each of said devices successively adjacent said conveyor with the open ends in the path of pins thereon, to cause the pin in the device adjacent said conveyor to engage said conveyor through said cutout portion and be removed through one of said ends from said device on said conveyor and to cause a pin traveling on said conveyor to enter said device through the other of said ends, a solenoid for actuating said intermittently operable clutch, manual means for briefly energizing said solenoid, and means on each of said devices operable upon the entry of a pin briefly to energize said solenoid.

6. Pin changing apparatus for a pin setting machine having a pin conveyor, comprising, in combination, a rotatable pin magazine having its periphery divided into a plurality of equal spaces, a plurality of open ended pin holding devices each adapted to hold a pin and each mounted on said magazine in one of said spaces, there being one more of said spaces than there are devices to provide a position wherein all the devices are out of the path of travel of pins on said conveyor, said magazine being in its normal stopped position when said blank space is adjacent said conveyor, and each of said devices having a cutout portion, an intermittently operable clutch connected to said magazine for moving said magazine through a portion of a revolution upon each operation successively to position each of said devices successively adjacent said conveyor and in the path of pins thereon, to cause the pin in the device adjacent said conveyor to engage said conveyor through said cutout portion and be removed through one of said ends from said device on said conveyor and to cause a pin traveling on said conveyor to enter said device through the other of said ends, a solenoid for actuating said intermittently operable clutch, manual means for briefly energizing said solenoid, and means for briefly energizing said solenoid comprising pin actuated means mounted on said pin holding devices.

7. Pin changing apparatus for a pin setting machine having a pin conveyor along which pins travel during a normal operating cycle of said machine, comprising, in combination, a rotatable pin magazine having its periphery divided into a plurality of equal spaces, a plurality of open ended pin holding devices each being horizontally disposed and adapted to hold one pin and each being mounted on said magazine in one of said spaces, there being one more of said spaces than there are devices to provide a position wherein all the devices are out of the path of travel of pins on said conveyor, said magazine being in its normal stopped position when said blank space is adjacent said conveyor, and each of said devices having a cutout portion, a one-revolution clutch connected to said magazine rotating said magazine in a direction transverse of the direction of travel of pins on said conveyor, each rotation of the clutch causing the magazine to rotate through a portion of a revolution successively to position each of said devices successively adjacent said conveyor with the open ends in the path of pins thereon to cause the pin in the device adjacent said conveyor to engage said conveyor through said cutout portion and be removed through one of said ends from said device on said conveyor and to cause a pin traveling on said conveyor during said normal operating cycle to enter said device through the other of said ends, means for operating said clutch, this means comprising a mechanical operating member adjacent said conveyor and connected to said clutch, a first means for actuating said mechanical operating member, this first means comprising a trip mechanism, means for operating said trip mechanism, this means comprising a solenoid and an actuating arm controlled by said solenoid, manual means for energizing said solenoid, a second means for actuating said mechanical operating member, this second means comprising an actuating member on each of said devices, and a yieldable member in the path of the pin entering said device, pressure exerted by said pin against said yieldable member causing said yieldable member to move said actuating member into actuating engagement with said mechanical operating member upon entry of a pin into said device.

8. Pin changing apparatus for a pin setting machine having a pin conveyor along which pins travel during a normal operating cycle of said machine, comprising, in combination, a rotatable pin magazine having its periphery divided into a plurality of equal spaces, a plurality of open ended pin holding devices each being horizontally disposed and adapted to hold one pin and each being mounted on said magazine in one of said spaces, there being one more of said spaces than there are devices to provide a position wherein all the devices are out of the path of travel of pins on said conveyor, said magazine being in its normal stopped position when said blank space is adjacent said conveyor and each of said devices having a cutout portion, intermittently operable means for moving said magazine transversely of the direction of travel of pins on said conveyor, each operation of such means causing the magazine to rotate through a portion of a revolution successively to position each of said devices successively adjacent said conveyor with the open ends in the path of pins thereon to cause the pin in the device adjacent said conveyor to engage said conveyor through said cutout portion and be removed through one of said ends from said device on said conveyor and to cause a pin traveling on said conveyor during said normal operating cycle to enter said device through the other of said ends, means for actuating said intermittently operable means comprising a mechanical operating member adjacent said conveyor and connected to said intermittently operable means, a first means for actuating said operating member, this means comprising a manually controlled electrically operable trip mechanism, a second means for actuating said operating member, this second means comprising an actuating member on each of said devices, and a yieldable member in the path of the pin entering said device, pressure exerted by said pin against said yieldable member causing said yieldable member to move said actuating member into actuating engagement with said operating member upon entry of a pin into said device.

9. Pin changing apparatus for a pin setting machine having a pin conveyor along which pins travel during a normal operating cycle of said machine, comprising, in combination, a rotatable pin magazine having its periphery divided into a plurality of equal spaces, a plurality of open ended pin holding devices each adapted to hold one pin and each mounted on said magazine in one of said spaces, there being one more of said spaces than there are devices to provide a position wherein all the devices are out of the path of travel of pins on said conveyor, said magazine being in its normal stopped position when said blank space is adjacent said conveyor, and each of said devices having a cutout portion, intermittently operable means for rotating said magazine in a direction transverse of the direction of travel of pins on said conveyor, each operation of such means causing the magazine to rotate through a portion of a revolution successively to position each of said devices successively adjacent said conveyor with the open ends in the path of pins thereon to cause the pin in the device adjacent said conveyor to engage said conveyor through said cutout portion and be removed through one of said ends from said device on said conveyor and to cause a pin traveling on said conveyor during said normal operating cycle to enter said device, through the other of said ends, means for actuating said intermittently operable means comprising a mechanical operating member adjacent said conveyor and connected to said intermittently operable means, means for actuating said operating member, said last mentioned means comprising manually operable means for initially actuating said operating member, an actuating member on each of said devices, and a yieldable member in the path of the pin entering said device, pressure exerted by said pin against said yieldable member causing said yieldable member to move said actuating member into actuating engagement with said operating member upon entry of a pin into said device.

10. Pin changing apparatus for a pin setting machine having a pin conveyor along which pins travel during a normal operating cycle of said machine, comprising, in combination, a rotatable pin magazine having its periphery divided into a plurality of equal spaces, a plurality of open ended pin holding devices each being horizontally disposed and adapted to hold one pin and each being mounted on said magazine in one of said spaces, there being one more of said spaces than there are devices to provide a position wherein all the devices are out of the path of travel of pins on said conveyor, said magazine being in its normal stopped position when said blank space is adjacent said conveyor, and each of said devices having a cutout portion, intermittently operable means for rotating said magazine in a direction transverse of the direction of travel of pins on said conveyor, each operation of such means causing the magazine to rotate through a portion of a revolution successively to position each of said devices successively adjacent said conveyor with the open ends in the path of pins thereon to cause the pin in the device adjacent said conveyor to engage said conveyor through said cutout portion and be removed through one of said ends from said device on said conveyor and to cause a pin traveling on said conveyor during said normal operating cycle to enter said device through the other of said ends, means for actuating said intermittently operable means, comprising a mechanical operating member adjacent said conveyor and connected to said intermittently operable means, a first means for actuating said operating member, this first means comprising a trip mechanism, means for operating said trip mechanism comprising a manually controlled solenoid and an actuating arm controlled by said solenoid, and a second means carried by said devices for actuating said operating member in response to the entry of a pin from the conveyor into said device which is adjacent said conveyor.

11. Pin changing apparatus for a pin setting machine having a pin conveyor, comprising, in combination, a rotatable pin magazine having its periphery divided into a plurality of equal spaces, a plurality of open ended pin holding devices each adapted to hold one pin and each mounted on said magazine in one of said spaces, there being one more of said spaces than there are devices to provide a position wherein all the devices are out of the path of travel of pins on said conveyor, said magazine being in its normal stopped position when said blank space is adjacent said conveyor, and each of said devices having a cutout portion, an intermittently operable clutch connected to said magazine for moving said magazine through successive portions of a revolution to position each of said devices successively adjacent said conveyor with the open ends in the path of pins thereon to cause the pin in the device adjacent said conveyor to engage said conveyor through said cutout portion and be removed through one of said ends from said device on said conveyor and to cause a pin traveling on said conveyor to enter said device through the other of said ends, a first means for actuating said intermittently operable clutch, this first means comprising a trip mechanism, a manually controlled solenoid and an actuating arm controlled by said solenoid for operating said trip mechanism, a second means for operating said intermittently operable clutch, this second means comprising an actuating member on each of said devices operable upon entry of a pin into the device which is adjacent said conveyor to actuate said intermittently operable clutch.

12. Pin changing apparatus for a pin setting machine having a pin conveyor, comprising, in combination, a movable pin magazine having its periphery divided into a plurality of equal spaces, a plurality of open ended pin holding devices each adapted to hold one pin and each mounted on said magazine in one of said spaces, there being one more of said spaces than there are devices to provide a position wherein all the devices are out of the path of travel of pins on said conveyor, said magazine being in its normal stopped position when said blank space is adjacent said conveyor, and each of said devices having a cutout portion, intermittently operable means for moving said magazine through successive portions of a revolution to position each of said devices successively adjacent said conveyor with the open end in the path of pins thereon, the pin in the device adjacent said conveyor engaging said conveyor through said cutout portion and being removed through one of said ends from said device on said conveyor and a pin on said conveyor entering said device through the other of said ends, means for initially operating said intermittently operable means, and means on each of said devices operable upon the entry of a pin from the conveyor to actuate said intermittently operable means.

13. Pin changing apparatus for a pin setting machine having a pin conveyor, comprising, in combination, a movable pin magazine having its periphery divided into a plurality of equal spaces, a plurality of open ended pin holding devices each adapted to hold one pin, all of said magazine spaces except one having a pin holding device mounted thereon, each of said devices having a cutout portion, and intermittently operable means for moving said magazine through successive portions of a revolution to position said devices adjacent said conveyor and in the path of pins thereon, the pin in the device adjacent said conveyor engaging said conveyor through said cutout portion and being removed through one of said ends from said device on said conveyor and a pin on said conveyor entering said device through the other of said ends.

14. Apparatus as claimed in claim 13, including means for successively actuating said intermittently operable means in response to the entry of a pin from said conveyor into successive pin holding devices.

15. Pin changing apparatus for a pin setting machine having a pin conveyor, comprising, in combination, a movable pin magazine having its periphery divided into a plurality of equal spaces, a plurality of pin holding devices each adapted to hold one pin and each mounted on said magazine in one of said spaces, each of said devices having pin openings at opposite ends and a longitudinal opening extending between the two ends through which the belly of the pin protrudes, and means for moving said magazine successively to position the pin openings in both ends of said devices in the path of travel of pins on said conveyor and to position said longitudinal opening adjacent said conveyor to remove pins from said machine and place different pins in said machine, the pins to be removed entering said pin devices through the pin opening in one end of each device and said different pins being held in said devices and when the belly of the pin engages said conveyor entering said machine through the pin opening in the other end of each device.

16. Pin changing apparatus for a pin setting machine having a pin conveyor, comprising, in combination, a movable pin magazine having a plurality of devices for holding pins, each device having an opening in one end for ingress of pins to said device and a second opening in the other end for the egress of pins therefrom, each device having a longitudinal opening extending between said first and second openings and which extends parallel to the pin conveyor, and means for intermittently moving said magazine successively to position said devices in the path of pins on said conveyor intermediate the ends of said conveyor during normal operation of said machine whereby pins in said devices are removed therefrom through said second opening as each device assumes a position in which said conveyor can engage a pin placed therein and a different pin advancing on said conveyor is fed into said device through said first opening.

17. Pin changing apparatus for a pin setting machine, comprising, in combination, means for advancing pins along a path of travel, a movable pin magazine having its periphery divided into a plurality of equal spaces, a plurality of pin holding devices each adapted to hold one pin in horizontal position and each mounted on said magazine in one of said spaces, there being one less device than there are spaces, said devices having pin openings at opposite ends thereof, and all of said devices normally being located out of the path of travel of pins in said machine, each device having means permitting the removal of a pin carried thereby when said means is positioned adjacent said advancing means, and means for moving said magazine successively to position said devices in the path of travel of pins in said machine to remove pins one by one from said machine and place different pins in predetermined position in said machine.

18. In a pin setting machine having a pin conveyor for carrying a first set of pins one-by-one to a pin setting mechanism, a pin changing apparatus comprising, in combination, a movable pin magazine having a plurality of pin holding devices, each of said devices being constructed and arranged to remove a pin from said conveyor and hold it for subsequent removal, said pin magazine overlying said conveyor and adapted to carry in said devices a second set of pins for use with said pin setting mechanism, and means for moving said magazine to successively position the pin holding devices above the pin conveyor and in the path of pins carried by the pin conveyor to receive the pins in the holding devices one-by-one and to engage the pins previously placed in said devices with the conveyor for removal from said devices by said conveyor.

GEORGE A. MONTOOTH.

REFERENCES CITED

The following references are of record in the file of this patent:

UNITED STATES PATENTS

| Number | Name | Date |
| --- | --- | --- |
| 1,468,212 | Redfield | Sept. 18, 1923 |
| 1,692,796 | Bishop | Nov. 20, 1928 |
| 2,319,925 | Flanagan | May 25, 1943 |
| 2,388,708 | Bates | Nov. 13, 1945 |
| 2,450,249 | Murphy | Sept. 28, 1948 |